Figure 1:
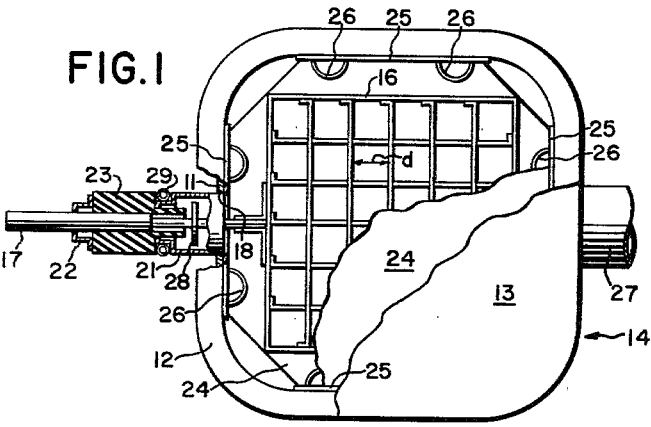

March 16, 1965     R. L. JEPSEN     3,174,069

MAGNETICALLY CONFINED GLOW DISCHARGE APPARATUS

Filed Nov. 29, 1961

INVENTOR.
ROBERT L. JEPSEN

BY *Wm. J. Nolan*
ATTORNEY

United States Patent Office 3,174,069
Patented Mar. 16, 1965

3,174,069
MAGNETICALLY CONFINED GLOW DISCHARGE APPARATUS
Robert L. Jepsen, Los Altos, Calif., assignor to Varian Associates, Palo Alto, Calif., a corporation of California
Filed Nov. 29, 1961, Ser. No. 155,737
2 Claims. (Cl. 313—161)

The present invention relates, in general, to a glow-discharge device and, more particularly, to an improved anode for such devices having critical proportions whereby an effective and also an economical anode is incorporated in a glow-discharge device for use in relatively high magnetic fields.

In U.S. patent application No. 797,673, filed on March 6, 1959, now U.S. Patent 3,028,071, dated April 3, 1962 having the same inventor and assigned to the same assignee as this application, there is taught a method whereby optimum pumping can be obtained from a sputter-ion vacuum pump that utilizes the glow-discharge principle and that is required to operate with a given magnetic field. That patent teaches that the diameter ($d$) of the cells in the cellular anode of a pump operating in a magnetic field B should be such that the product B$d$ is in a range between .15–1.2 kilogauss inches in order that the optimum pumping speed is obtained from a pump.

According to the above teachings one approach that has been used to design sputter-ion vacuum pumps is to choose an economical permanent magnet that produces maximum magnetic field for minimum expense. The anode of the pump is then designed with a given cell size by using the teachings disclosed in the above mentioned patent, so that optimum pumping speed per unit volume is obtained. Now, if a large magnetic field is already in existence in the apparatus of interest, the utilization of this field in a sputter ion vacuum pump operation would be desirable, as it would eliminate the need of a permanent magnet. However, if the available magnetic field is very large, for example, greater than 3 kilogauss, and the teachings as disclosed in the above patent are used, the anode cell diameter for optimum pumping speed per unit volume would be too small to fabricate economically, and if the anode is made with the small cell diameters the power density at high pressure could be such that cooling of the anode would become a problem, as will be explained hereinafter.

Optimum pumping speed refers hereinafter to when the pumping speed per unit volume is optimized for a given magnetic field intensity by matching the anode cell diameter to the magnetic field. Observations show that if a pump has an anode that was designed for optimum pumping speed within a given magnetic field, its pumping speed can be further increased with increases in magnetic field intensity. The pumping speed will reach a maximum and then the speed decreases with further increases in magnetic field. Hereinafter maximum pumping speed refers to when the pumping speed is maximized per unit volume for a given cell diameter by matching the magnetic field to the given anode cell diameter. Of course, as mentioned in the above patent, the shape of the cell is not limited to circular cylinders, but then the diameter would refer to the diameter of the smallest circular which can be transcribed in the opening transversely to the axis of the cell.

An object of this invention is to provide a sputter-ion vacuum pump anode having a practical size cell, sufficient pumping speed, and sufficient cooling when in a relatively high magnetic field.

One feature of this invention is the provision of an anode cell for a sputter-ion vacuum pump wherein the product of cell diameter and magnetic field intensity is within the range of 1.2–3.0 kilogauss inches and preferably approximately 2.5 kilogauss inches while the magnetic field intensity is greater than 3 kilogauss.

Figure 2:
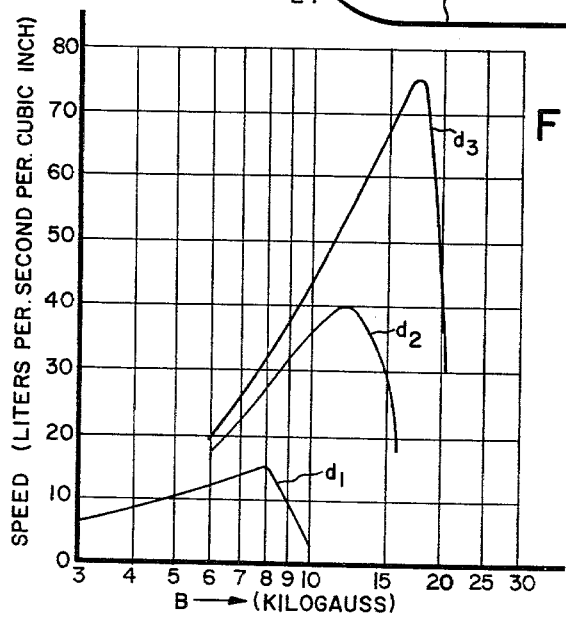
Figure 3:
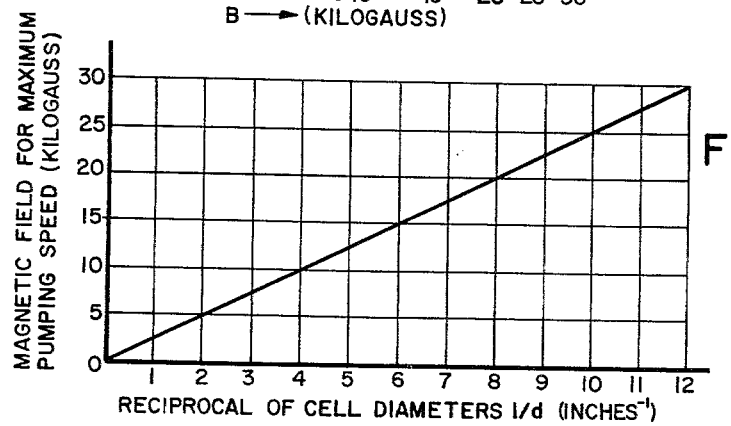

Other features and advantages of the present invention will become apparent upon a perusal of the specification taken in connection with the accompanying drawings wherein:

FIG. 1 is a plan view partly in cross section of a typical electric sputter-ion vacuum pump apparatus, FIG. 2 is a graph of the pumping speed per unit volume versus the magnetic field intensity as a function of anode cell diameter, and FIG. 3 is a graph of the magnetic field intensity versus the reciprocal of anode cell diameter as a function of maximum pumping speed for a given sputter-ion pump.

Referring now to the drawing and to FIG. 1 in particular, a shallow rectangular cup member 11 as of, for example, stainless steel, is closed off at its flanged open end by a rectangular closure plate 13 welded about its periphery to a flange 12 of member 11, thereby forming a substantially rectangular vacuum tight envelope 14.

A rectangular cellular anode 16 as of, for example, titanium, is carried on the end of a conductive rod 17 as of, for example, stainless steel, which extends outwardly of the rectangular vacuum envelope 14 through an aperture 18 in a short sidewall thereof. The conductive rod 17 is insulated from and carried by the vacuum envelope 14 through the intermediaries of an annular insulator frame including, for example a Kovar ring 21 welded to aperture 18, another Kovar ring 22 welded to rod 7, and a tubular ceramic insulator 23 bonded to rings 21 and 22. The outer free end of rod 17 serves to provide a terminal for applying a positive potential on the anode 16 with respect to two substantially rectangular cathode plates 24, disposed within vacuum envelope 14. The anode 16 is sandwiched between and spaced from the two cathode plates 24.

The cathode plates 24 are made of reactive metal and are mechanically locked in position against the large flat side walls of the vacuum envelope 14 via the intermediary of four cathode spacer plates 25. The cathode spacer plates 25 as of, for example, stainless steel, are each provided with two semi-cylindrical ears 26, struck therefrom for assuring proper spacing between the cathode plates 24. The cathode plates 24 may be of any one of a number of reactive cathode metals such as, for example, titanium, chromium, zirconium, gadolinium, and iron. However, the anode 16 and cathodes 24 are preferably made of the same material to prevent flaking of condensed sputtering layer of the cathode material on the anode.

Another sidewall of vacuum envelopes 14 is apertured to receive the hollow conduit 27 which may be of any convenient inside diameter commensurate with desired pumping speed. The hollow conduit 27 communicates with the structure to be evacuated and is provided with suitable mounting flange (not shown).

A circular radial shield 28 as of, for example, molybdenum, is carried transversely on conductive rod 17 and is disposed inside the ring 21 for shielding the insulator 23 from the sputtered cathode material which might otherwise coat the insulator 23 and produce unwanted voltage breakdown of current leakage thereacross. An annular spring 29 is positioned circumscribing the ring 21 to provide a quick disconnection between the power connector (not shown) and the vacuum pump.

The pump during operation is immersed in a magnetic field which has an intensity B that threads through the individual cells of anode 17 in substantial parallelism to the longitudinal axis thereof, and perpendicular to the cathode plates 24. As taught in the above mentioned patent the speed of the sputter-ion pump is related to the product of the magnetic field B and a diameter $d$ of the individual anode cell, and for a given magnetic field there is an optimum cell diameter size after which the pumping speed drops with increases in the $d$ dimension.

There are many applications where a vessel to be evacuated has a magnetic field included for other reasons. If a sputter ion vacuum pump could be designed to use this field the need of an additional magnetic field would be eliminated. If the magnetic field is less than 3 kilogauss, there is generally no problem in designing the vacuum pump as the optimum cell diameter could be less than 1/3 of an inch and no additional provisions for cooling would be required. However, if the magnetic field is above 3 kilogauss and optimum cell diameter is used over-heating of the pump at fairly high pressures becomes a problem. When the magnetic field is at least 8 kilogauss then designing an anode by using the teachings of the above patent produces a cell diameter of less than 1/8 inch, thereby increasing the fabrication cost. Then with very large magnetic fields small cell diameters would be economically impractical. For example, if a magnetic field of 20,000 gauss is available for use with a sputter-ion vacuum pump, then the optimum cell diameter would be about .05 inch or less. A cellular anode with closely spaced cells having a diameter of .05 inch is expensive and tedious to fabricate, and requires very special tooling.

Referring now to FIG. 2, typical pumping speeds per unit volume of a vacuum pump are plotted with respect to magnetic field intensity B for three different diameters for anode cells. Curve $d_1$ represents, with respect to the magnetic field, the pumping speed for an anode having a cell diameter equal to $d_1$; then $d_2$ represents the pumping speed for an anode having cell diameter equal to $d_2$ that is smaller than $d_1$; and curve $d_3$ represents the pumping speed of an anode having a cell diameter equal to $d_3$ that is smaller than $d_2$. (These curves were obtained from experimental data where the cells are cylindrical and $d_1$, $d_2$, and $d_3$ equaled .3, .2 and .15 inch, respectively, and hydrogen was being pumped. The pumping speed is scaled in liters per second per cubic inch, and the magnetic field is scaled in kilogauss and plotted on a logarithmic scale to indicate sharply where the curve peaks.) For any given diameter, the pumping speed increases with increases in magnetic field until a maximum speed is obtained and then the speed drops off. The maximum speed for the smaller diameter cell peaks at higher magnetic fields than the maximum pumping speed of the larger diameter cells. This relationship is plotted in the graph of FIG. 3 where the magnetic field in kilogauss at which the maximum pumping speed occurs for a given cell diameter, is plotted in relation to the reciprocal of the cell diameter in inches. The curve is substantially a straight line having a slope of approximately 2.5 kilogauss-inches.

Referring again to FIG. 2, if the magnetic field is equal to about 7 kilogauss or more, the pumping speed per unit volume increases as cell diameter decreases. When the magnetic field is increased to about 10 kilogauss the pumping speed of the largest cell diameter $d_1$ rapidly decreases, while the speed of the smallest cell diameter rapidly increases. When the magnetic field is further increased to about 17 kilogauss the smallest cell diameter $d_3$ is at maximum pumping speed. As discussed above, if, for example, a magnetic field of 12 kilogauss is available a cell diameter of $d_2$ would produce maximum pumping speed. If a cell diameter of $d_3$ is used, the pumping speed would be approximately optimum, but an anode having numerous cells of small size is more expensive to fabricate than an anode having less cells of larger size. Then, since the pumping speed is increased, more power is required, to where cooling becomes a problem. Thus, the larger cell diameter, for example, $d_2$ over $d_3$ at B equal 12 kilogauss, would be preferred. However, if the cell diameter is increased indiscriminately, one would find that the pumping speed has been reduced to an inefficient value, for example, $d_1$ at B equal 12 kilogauss. FIG. 3 teaches that if the product of magnetic field and cell diameter is approximately 2.5 kilogauss inches maximum speed is obtained. FIG. 2 shows that if the product is as high as 3 kilogauss-inches, the speed of the pump would be approximately 50% of maximum, and since the slope of the speed curve has a large negative valve, 3 kilogauss-inches appears to be the maximum product one could practically incorporate within a sputter ion pump.

Since many changes could be made in the above construction and many apparently widely different embodiments of this invention could be made without departing from the scope thereof, it is intended that all matter contained in the above description or shown in the accompanying drawings shall be interpreted as illustrative and not in a limitng sense.

What is claimed is:

1. A magnetically confined glow discharge apparatus including: an apertured anode member; a cathode member disposed on opposite sides of said anode member and being slightly spaced therefrom; means for applying a potential to said anode member positive with respect to said cathode member; means for producing and directing a magnetic field of intensity B in kilogauss through said anode member for enhancing the glow discharge; said anode member being subdivided into a plurality of compartments distributed transversely of said magnetic field defining a plurality of glow discharge passageways therethrough, the smallest dimension of said compartments taken transverse to said magnetic field being equal to $d$ in inches; and, the B$d$ product being within the range of 1.2–3.0 kilogauss inches while B is greater than 3 kilogauss.

2. A magnetically confined glow discharge apparatus including: an apertured anode member; a cathode member disposed on opposite sides of said anode member and being slightly spaced therefrom; means for applying a potential to said anode member positive with respect to said cathode member; means for producing and directing a magnetic field of intensity B in kilogauss through said anode member for enhancing the glow discharge; said anode member being subdivided into a plurality of compartments distributed transversely of said magnetic field defining a plurality of glow discharge passageways therethrough, the smallest dimension of said compartments taken transverse to said magnetic field being equal to $d$ in inches; and, the B$d$ product being approximately 2.5 kilogauss inches while B is greater than 3 kilogauss.

References Cited in the file of this patent
UNITED STATES PATENTS
2,993,638    Hall ------------------- July 25, 1961